United States Patent [19]

Schwob

[11] 4,449,035

[45] May 15, 1984

[54] ARRANGEMENT FOR MOUNTING A THERMISTOR-TYPE TEMPERATURE SENSOR IN A METALLIC HEATING DEVICE

[75] Inventor: Pierre Schwob, Lyons, France

[73] Assignee: SEB S. A., Selongey, France

[21] Appl. No.: 333,266

[22] Filed: Dec. 22, 1981

[30] Foreign Application Priority Data

Jul. 4, 1981 [LU] Luxembourg .............................. 83286

[51] Int. Cl.³ .......................... G01K 1/16; G01K 7/16; H05B 1/02
[52] U.S. Cl. ..................................... 219/251; 219/240; 219/449; 219/505; 219/516; 338/22 R; 338/28; 374/183; 374/185; 374/208
[58] Field of Search .................. 338/22 R, 22 SD, 23, 338/24, 28; 219/240, 251, 252, 449, 450, 501, 504, 505, 516; 38/82; 374/183-185, 179, 208

[56] References Cited

U.S. PATENT DOCUMENTS

| | | | |
|---|---|---|---|
| 2,686,250 | 8/1954 | Schroeder | 219/504 X |
| 3,221,284 | 11/1965 | Summerer | 219/505 X |
| 3,286,077 | 11/1966 | Radford et al. | 219/251 |
| 3,393,296 | 7/1968 | Gambill | 219/449 X |
| 3,456,095 | 7/1969 | Fox | 219/501 |
| 3,696,676 | 10/1972 | Butter | 374/141 |
| 3,701,884 | 10/1972 | Finney | 219/449 |
| 3,732,394 | 5/1973 | Cusworth | 219/501 X |
| 4,230,935 | 10/1980 | Meixmer | 338/22 R |
| 4,322,900 | 4/1982 | Hacker et al. | 219/252 X |

FOREIGN PATENT DOCUMENTS

| | | |
|---|---|---|
| 2107924 | 9/1971 | Fed. Rep. of Germany . |
| 1573465 | 1/1972 | Fed. Rep. of Germany . |
| 1569533 | 5/1969 | France . |

OTHER PUBLICATIONS

"Techniques for Measuring Surface Temperature", by G. G. Watson, Instrument Practice, vol. 20, Jun. 1966, pp. 517–524.
"Messung Von Oberflachentemperaturen mit Beruhrungsthermometern", by G. Teunis, Verein Deutscher Igenieure (VDI), vol. 112, 1966, pp. 103–108.

Primary Examiner—A. Bartis
Attorney, Agent, or Firm—Young & Thompson

[57] ABSTRACT

An electric resistance heating device including a body having a metal mass and a sheathed electric heating element for heating the mass is provided with a temperature sensing thermistor designed for electronic temperature regulation. The thermistor together with the leads thereof is housed in a shrunk thermoplastic, e.g., PTFE, sheath and is inserted into a cavity within the mass closely approaching the heating element sheath through an orifice closed by a metal sealing plug having substantially the same composition and thermal characteristics as the mass. The cavity and the face of the plug are shaped to closely correspond to the sheath containing the thermistor and leads and any air spaces existing between the sheath, the mass and plug are filled with a silicone putty, such as silastene. The sealing plug is force fit within the orifice or inset therein by plastic deformation of the metallic mass.

9 Claims, 3 Drawing Figures

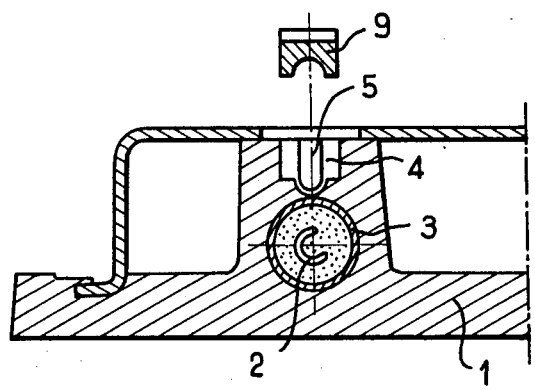
FIG_1
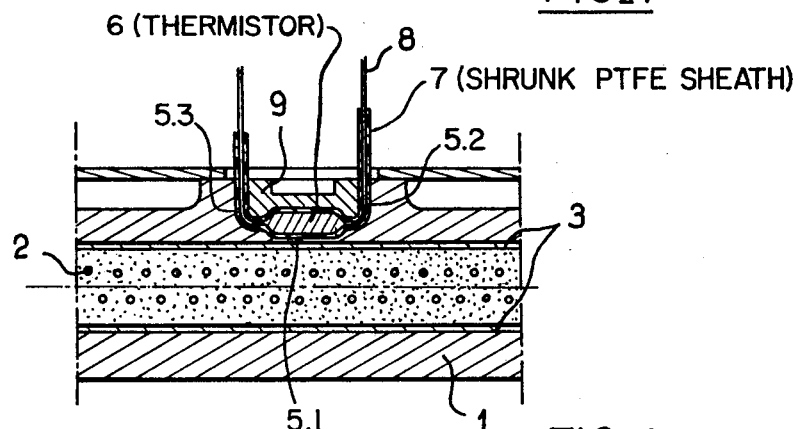
FIG_2
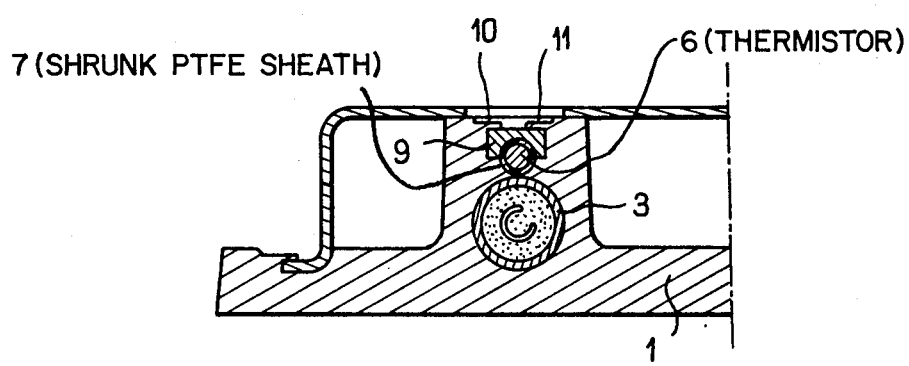
FIG_3

ARRANGEMENT FOR MOUNTING A THERMISTOR-TYPE TEMPERATURE SENSOR IN A METALLIC HEATING DEVICE

This invention relates to means for attachment and temperature sensing by making use of a thermistor mounted on a heating device and more particularly on the sole-plate of an electronically-regulated laundry iron.

The method which is most closely related to the means according to the invention for sensing temperature by means of a thermistor consists in sealing the thermistor within an electrically insulating ceramic body, in incorporating said body within an orifice formed in the sole-plate and finally in sealing it in position by means of putty or cement. However, this method is attended by a disadvantage in that it entails the use of parts which are bulky and therefore form a heat-dissipating bulge on the sole-plate of the laundry iron. In consequence, the measured value no longer corresponds to the temperature of the sole-plate and provides only a very approximate and unreliable response to the true value.

The aim of this invention therefore consists in providing an attachment and temperature-sensing means which produces an accurate measurement without inertia. In order to achieve this result, it should in principle be ensured that the outer wall of the thermistor is not electrically connected to a voltage supply. It would be necessary above all to ensure that said thermistor is rigidly fixed to the metal mass by overmolding in situ at the time of casting of the heating device in the foundry workshop. This technique of molding in situ is commonly employed for inclusion of the shielded heating resistor but the casting temperatures involved do not permit application of this technique to inclusion of a thermistor. The present invention tends to reproduce artificially the thermal and mechanical advantages provided by said method of molding in situ.

The invention is accordingly distinguished by the fact that the thermistor is inserted in the mass of the heating device, the orifice formed for the introduction of the thermistor being closed by means of a metal part substantially of the same composition as said heating device. Said metal part is fitted within its housing as tightly as possible, either by force-fitting or plastic deformation of metal with addition of putty if necessary. The distinctive feature of the thermistor lies in the fact that it is electrically insulated by means of a shrinkable PTFE (polytetrafluoroethylene) sheath of small thickness.

The temperatue sensor according to the invention therefore comprises an orifice of rectangular shape, for example, in which a metal part designated hereinafter as a sealing plug is engaged after introduction of the thermistor. The heating device may be the sole-plate of an electric laundry iron. If said heating device is made of an alloy of the type known as AS9.3, the added metal part or sealing plug mentioned above is also of AS9U3 or of any other suitable aluminum alloy such as AS13 or A5L.

The half-impression of the thermistor and the half-impressions of the connecting leads are cut respectively on the bottom face and the two opposite lateral faces of the orifice. The same applies to the corresponding faces of the sealing plug. Since the PTFE sheath is fitted over the thermistor by shrinking-on, no air pocket is allowed to remain between this insulating sheath and the thermistor.

Insertion of this subassembly in the impression left between the sealing plug and the heating device is carried out with the addition of silicone putty. The excess quantity of putty is driven out at the time of assembly of the parts, fills all spaces and interstices which may exist along sharp edges and corners, for example. There is therefore no space which is in any way liable to contain air and no interruption of continuity which is liable to interfere with heat transfer.

In order to ensure that the thermistor has a very short response time, the half-impression located at the bottom of the orifice is formed on the shielding tube of the electric heating resistor.

Other features of the invention will be more apparent upon consideration of the following description relating to one exemplified embodiment and reference will be made to the accompanying drawings, wherein:

FIG. 1 is a partial transverse sectional view of the sole-plate of a laundry iron;

FIG. 2 is a longitudinal sectional view of said sole-plate;

FIG. 3 is a transverse sectional view of the sole-plate after insetting of the sealing plug.

The sole-plate 1 of the laundry iron comprises a heating resistor 2 included within a shielding tube 3. A rectangular orifice 4 is provided with a semi-circular groove 5 on the bottom faces 5.1 and lateral faces 5.2 and 5.3. The bottom groove 5.1 is located directly on the shielding tube of the heating resistor. However, a small web of material may remain as a result of spaces between the constituent parts of the mold. The thermistor 6 is encased in a shrinkable polytetrafluoroethylene tube 7 and placed within the bottom groove 5.1 whereas the connecting leads 8 are housed within the lateral grooves 5.2 and 5.3. A bead of silicone putty (such as silastene) is deposited at the bottom of the orifice 4. A sealing plug 9 having shapes corresponding to those of the orifice 4 which is fitted with the thermistor 6 is then inserted within the orifice 4 and pressed down. Any excess quantity of putty is discharged through the interstices resulting from the rounded portions of the parts which cannot have sufficiently sharp edges in practice. In order to maintain the sealing plug 9 in position, it may be forcibly driven downwards within the orifice 4. Alternatively, if the manufacturing tolerances are too broad, an insetting operation can be performed by subjecting the metal of the sole-plate 1 to plastic deformation at the points 10 and 11.

All contacts between the thermistor and the PTFE sheath and between said sheath and the sole-plate or the sealing plug 9 are made either directly or by means of the silicone putty but no pocket of air, water or water vapor is allowed to remain.

It should be readily apparent that the invention is not limited to the example described in the foregoing but extends to all minor variations within the capacity of those versed in the art. Thus the invention is not limited either to cylindrical thermistors or to line connections. For the other configurations of known thermistors, it is only necessary to modify the geometry of the orifice 4, the grooves 5 and the sealing plug 9. The sealing putty can be replaced by other products such as cements provided that they have adequate heat transfer characteristics.

What is claimed is:

1. A heating device including a body having a metal mass and an electric resistance element for heating the mass, and a temperature sensing thermistor which is disposed in a cavity between an orifice in the mass and a metal sealing plug having substantially the same composition as the mass and is connected to the exterior of the mass by lead means, wherein the thermistor and the lead means are housed in a shrunk sheath of thermoplastic material, and wherein the orifice and that face of the plug which is adjacent the orifice are so shaped as to define for the cavity a shape substantially corresponding to the space occupied in the orifice by the sheath containing the thermistor and the lead means.

2. A temperature sensor according to claim 1, wherein the sealing plug is held in position by force-fitting within the orifice aforesaid.

3. The temperature sensor according to claim 1, wherein the sealing plug is inset within the orifice aforesaid by plastic deformation of the metal of the mass.

4. A temperature sensor according to claim 1, wherein the interstices and the spaces existing between said orifice and said sealing plug, between said thermistor and said mass and between said thermistor and said sealing plug are filled with material having good heat conductivity.

5. A temperature sensor according to claim 1, wherein the thermistor is practically applied against a shielding tube of the resistance heating element.

6. A temperature sensor according to claim 1, wherein the thermistor is insulated by means of said sheath of shrinkable thermoplastic material.

7. A temperature sensor according to claim 6, wherein the sheath is of polytetrafluoroethylene.

8. A temperature sensor according to claim 1, wherein the thermistor is placed in parallel relation to the external surface of the heating element.

9. A heating device according to claim 1, wherein the cavity between the orifice and the plug extends to the external surface of the mass and the lead means extends to the exterior of the mass between the plug and the orifice.

* * * * *